Oct. 12, 1965   C. NUSS   3,210,939

FLOW CONTROL DEVICE

Filed Jan. 24, 1964

INVENTOR.
Christopher Nuss.
BY Harness & Harris
ATTORNEYS.

United States Patent Office 3,210,939
Patented Oct. 12, 1965

3,210,939
FLOW CONTROL DEVICE
Christopher Nuss, Roseville, Mich., assignor to Chrysler Corporation, Highland Park, Mich., a corporation of Delaware
Filed Jan. 24, 1964, Ser. No. 340,009
4 Claims. (Cl. 60—52)

This invention relates to improvements in a fluid flow control device particularly adapted for use in metering the rate of flow of pressurized fluid to a hydraulically actuated power steering gear for an automobile.

It is customary to supply pressurized fluid to an automobile power steering gear by means of a pump driven by the automobile engine, such that the pump is operated at maximum speeds and is capable of delivering its maximum power when the automobile is cruising at high speed along the highways. The power steering gear on the other hand is ordinarily under maximum load and requires maximum power from the pump when the automobile is operating at low speeds, as for example during a parking maneuver.

It has been customary to strive for a "drooper" effect in the rate of flow of pressurized fluid from the steering gear pump, such that as the vehicle engine speed increases, the rate of flow of pressurized fluid decreases. This effect is only partially satisfactory because the minimum steering power is not always required at high vehicle speeds, as is evident during a front tire blow-out or when one front wheel suddenly runs onto a soft shoulder of the road. The actual relationship between steering power and vehicle operation requires steering power proportional to steering load, independently to engine speed.

It is accordingly an object of the present invention to provide an improved flow control device suitable for use with an automobile steering gear, which supplies pressurized fluid to the gear at an increasing pressure and rate of flow as the steering load increases, regardless of engine speed.

Inasmuch as the hydraulic power to the steering gear is proportional to the product of the fluid pressure and the rate of fluid flow, by increasing the rate of flow as the pressure increases, the necessary steering power can be supplied at a lower fluid pressure than is otherwise necessary when the rate of fluid flow is maintained substantially constant. Thus the power steering gear can be operated at lower maximum pressures than has been feasible heretofore, with consequent reduced costs and rates of wear for both the steering gear and pump.

Other objects of this invention will appear in the following description and appended claims, reference being had to the accompanying drawings forming a part of this specification wherein like reference characters designate corresponding parts in the several views.

Figure 1:
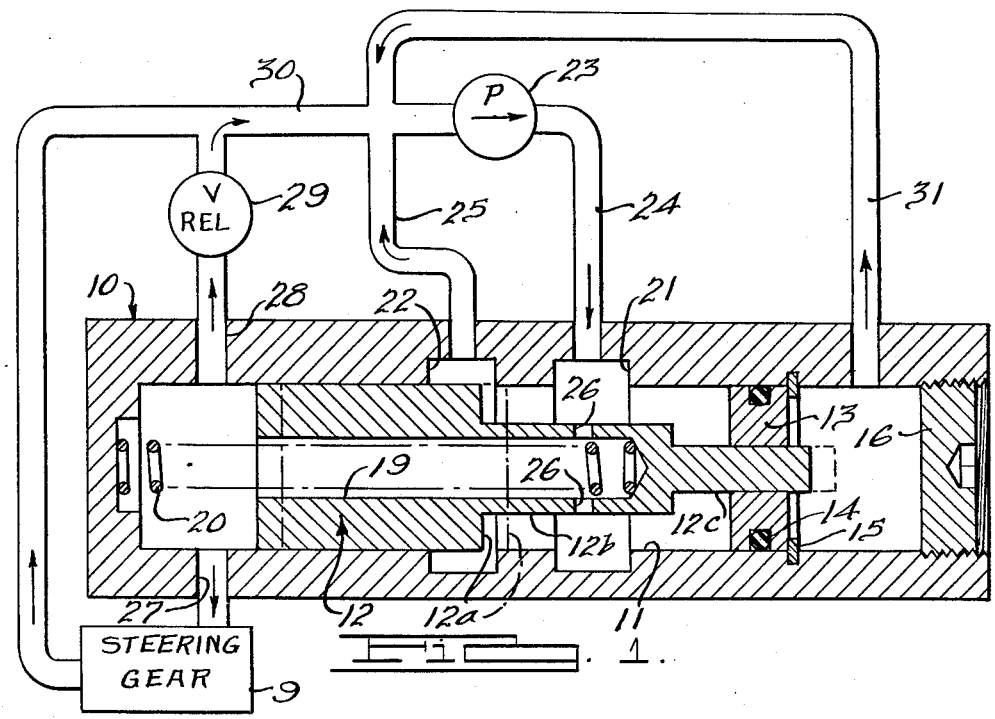
FIGURE 1 is a schematic cross-sectional view taken axially along the mid-region of a flow control device embodying the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings a particular embodiment of the present invention is illustrated by way of example in a flow control device particularly suitable for use in supplying pressurized fluid to an automobile power steering gear 9. The flow control device comprises a valve housing 10 containing a cylindrical bore or valve chamber 11 for an axially slidable spool valve 12. The latter is provided with an enlarged land portion 12a at its left end which completely fills the cross sectional area of the bore 11 and slidably engages the latter in fluid sealing relationship to block axial flow of pressurized fluid from one end of the valve 12 to the other.

The land 12a terminates in an integral cylindrical extension 12b of reduced diameter, which in turn terminates in an integral axially extending cylindrical guide 12c of still further reduced diameter. The guide 12c extends slidably in fluid sealing and guided relationship through the central bore of an annular closure 13. A seal 14 is provided around the periphery of closure 13 between the latter and the interior side wall of bore 11, whereby the right end of valve chamber 11 is sealed against loss of pressurized fluid. A C-shaped spring clip 15 recessed partially into the interior wall of bore 11 adjacent the exterior of closure 13 retains the latter against endwise movement when subject to pressure as described below. By this construction, the valve 12 is supported and guided at its opposite ends 12a and 12c. Spaced axially endwise from the closure 13 is an outer plug 16 which may be suitably screwed into the end of bore 11 to provide an outer closure therefor.

The spool valve 12 is provided with an axial bore 19 opening at its left end and containing a coil spring 20 under compression between the portion of the valve 12 at the base or right end of bore 19 and an end wall of the housing 10 closing the left end of chamber 11. Extending radially through the side wall of housing 10 into the chamber 11 is an inlet port 21 at the region of the reduced extension 12b and a bypass port 22 spaced axially leftward of the port 21. A source of fluid pressure which may comprise a pump 23 is connected with the ports 21 and 22 respectively by an inlet line 24 and an exhaust or return line 25.

The reduced extension 12b is provided with a plurality of restricted metering ports 26 at the region of the inlet port 21, whereby fluid pumped from pump 23 enters chamber 11 via port 21 and thence passes through metering ports 26 to the interior of bore 19 and to the left end of chamber 11, from whence the metered fluid is discharged via operating port 27 to a fluid actuated device, as for example the fluid actuated automobile power steering gear 9. Also opening from the left end of chamber 11 is a pressure relief port 28 which is normally maintained closed by a pressure relief valve 29 adjusted to open at a predetermined maximum pressure to discharge fluid via line 30 to the inlet of pump 23. A drain line 31 also connects the portion of bore 11 between closures 13 and 16 with the inlet of pump 23.

In operation of the device shown, spring 20 is effective to urge spool valve 12 to the right toward a closed position indicated by the dotted lines whereat land 12a closes bypass port 22. Upon operation of pump 23, pressurized fluid entering chamber 11 via port 21 passes through metering ports 26 and operating port 27 to the steering gear 9. The metering ports 26 are dimensioned to pass metered fluid at a predetermined rate of flow in the neighborhood of 2 gallons per minute. When the rate of flow of fluid discharged from pump 23 exceeds the rate of metered flow through ports 26, pressure will build-up at the right side of land 12a and urge valve 12 leftward against the force of spring 20 to the open position illustrated by solid lines, thereby to return the excess pump capacity to the inlet side of the pump 23.

During normal straight-ahead steering, the fluid pressure required to operate the steering gear 9 will be a minimum, so that the pressure at port 27, i.e. the pressure in chamber 11 at the left end of valve 12, will likewise be a minimum and the pressure drop across metering ports 26 will be determined primarily by the force of spring 20, or the force required to compress spring 20 by moving valve 12 leftward from the closed to the open position illustrated. Thus the pressure drop across metering ports 26 will also be a minimum and the rate of fluid flow therethrough will be a minimum as required for operation of the steering gear 9 during low reaction conditions of straight-ahead steering for example.

When the steering gear 9 is operating under heavier loads, so as to increase the back pressure at port 27 and in chamber 11 at the left end of valve 12, as for example during a parking maneuver or steering in heavy sand, a faster steering response and a correspondingly greater rate of flow through metering ports 26 is desired. In order to increase the pressure differential across metering ports 26 and thereby to increase the rate of metered fluid flow therethrough as the power requirement of the steering gear 9 increases, the fluid pressure applied to the steering gear 9, i.e. downstream of metering ports 26, is also applied to the left end of valve 12 to supplement the force of spring 20 urging valve 12 toward the closed position.

The pressure force at the left end of valve 12 is opposed by the pressure within chamber 11 at the right end of valve 12. However, the effective area of the left end of valve 12 subject to the pressure at port 27 is greater than the effective area of the right end of valve 12 subject to the pressure of port 21 by an amount equal to the diametrical cross sectional area of guide extension 12c. In consequence, as the pressure at port 27 increases with an increasing power demand from the steering gear 9, the force urging valve 12 rightward to the closed position will increase. In order to force the valve 12 to the open position so as to by-pass the excess pump capacity, the pressure at port 21 acting on the smaller effective area at the right end of valve 12 will necessarily increase with respect to the pressure acting on the larger left end of valve 12. Inasmuch as the latter pressure equals the pressure within bore 19, the pressure drop across metering ports 26 will be increased and the rate of fluid flow therethrough will be increased as required by the increased power demand from the steering gear.

A first approximation of the relationship between the forces acting on valve 12 is illustrated by the equation:

(1) $$S+A(P-P')=aP$$

where
S is the force of spring 20,
A and $a$ are the effective cross sectional areas at the left and right ends respectively of valve 12,
P is the fluid pressure at port 21, and
P' is the fluid pressure differential across ports 26.
Thus
(2) $$AP'=S+P(A-a)$$

A, $a$ and S are constant. Therefore,
P' increases as P increases. For small values of P, S controls the value of P'. As P increases in value, it tends to dominate the value of P'.

Figure 2:
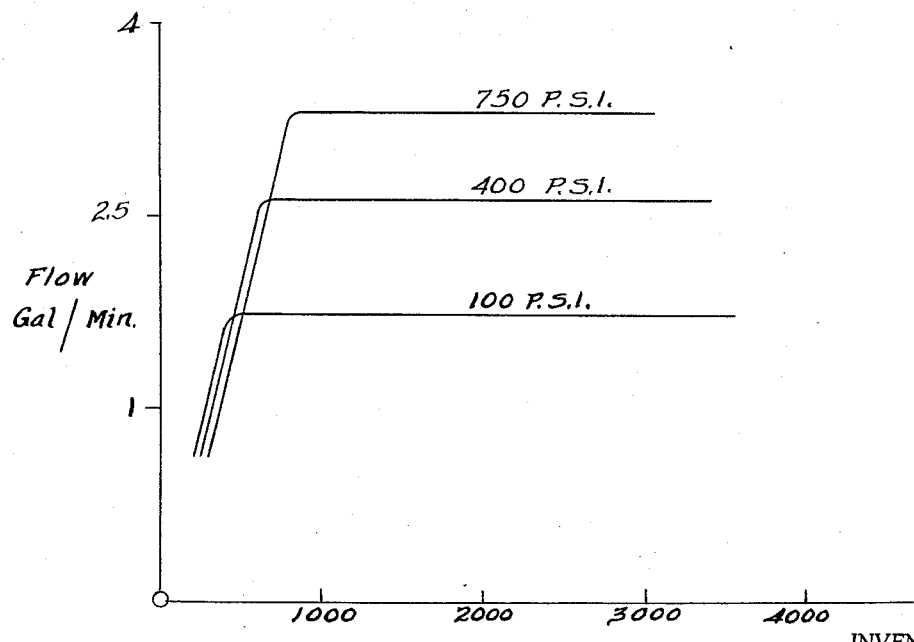
FIGURE 2 is a graphic representation of a family of curves at different operating pressures showing the fluid flow in gallons per minute on the ordinate and the pump speed in revolutions per minute on the abscissa.

As illustrated in FIGURE 2, when the reaction pressure of the steering gear is 100 p.s.i., valve 12 will move to the open position when the pressure drop across ports 26 is such as to cause a flow of slightly less than two gallons per minute. When the steering reaction approaches a higher value of for example 750 p.s.i., the pressure drop across metering ports 26 will increase to effect a metered flow therethrough of a little more than three gallons per minute.

By virtue of the lower rate of metered flow through the ports 26 when the steering is under comparatively low load, as for example during straight-ahead steering, it is feasible to design the valve 12 and ports 26 so as to achieve a substantially uniform rate of metered flow though ports 26 wtih increasing pump speed, as illustrated in FIGURE 2. Inasmuch as the flow control device automatically achieves an increased rate of metered flow through the ports 26 with increasing steering load, there is no need to strive for the heretofore customary "drooper" effect whereby the rate of metered flow decreases with increased pump speed. The rate of metered flow to the steering gear 9 will at all times be a direct function of the power demands of the steering gear, regardless of the pump speed.

Although the spring 20 is desirable in a flow control device for use in an automobile power steering gear in order to predetermine the desired minimum rate of metered fluid flow to the steering gear under conditions of nominal steering load, the spring 20 is otherwise unnecessary to the operation of the device. As long as a small back pressure exists in bypass port 22, this pressure will be applied through ports 26 to the left end of valve 12 to urge the latter rightward toward the closed position in the absence of spring 20. Thereafter, a pressure increase at port 27 resulting from the power demand of an hydraulically actuated tool connected to port 27 will result in an increased force tending to close valve 12 and a correspondingly increased pressure drop across ports 26 a described above.

I claim:
1. In combination, a fluid pressure actuated vehicle power steering gear, an inlet port, means for supplying pressurized fluid to said inlet port, a restricted metering port connecting said inlet port and gear for supplying the latter with pressurized metered fluid from said inlet port but at reduced pressure, exhaust means for said pressurized fluid, a bypass port opening into said exhaust means, valve means cooperable with said ports and shiftable to a closed position for closing said bypass port to both said inlet and metering ports, said valve means being shiftable in one direction from said closed position for progressively opening said bypass port to said inlet port to effect a restricted communication between said inlet port and exhaust means, said valve means having first and second effective areas arranged in opposition to each other and adapted to be exposed to fluid pressure to cause shifting of said valve means in said one direction and the opposite respectively, means for connecting the pressurized fluid at said inlet port and at said steering gear to said first and second areas respectively, said first area being smaller than said second area, and means yieldingly urging said valve means in said opposite direction, the last named means being yieldable in response to fluid pressure on said areas to enable shifting of said valve means from said closed position when the fluid pressure on said first area tends to exceed a predetermined value with respect to the fluid pressure differential across said metering port.

2. In combination, a fluid pressure actuated vehicle power steering gear, a valve housing enclosing a valve chamber and having an inlet port and a bypass port communicating with said chamber, a spool valve shiftable in opposite directions within said chamber to and from a closed position and having portions cooperable with the walls of said chamber to block communication between said ports when said valve is at said closed position and to progressively establish commnication between said ports upon shifting of said valve in one of said directions from said closed position, thereby to effect restricted communication between said inlet and bypass ports, said valve having a first effective area at one end adapted to be exposed to fluid pressure to cause shifting of said valve in the direction opposite said one direction to said closed position and having a second effective area at its opposite end smaller than said first effective area and adapted to be exposed to fluid pressure to cause shifting of said valve in said one direction, pump means connected with said inlet port for supplying pressurized fluid thereto, a restricted metering port connecting said inlet port and steering gear for supplying the latter with pressurized metered fluid from said inlet port but at reduced pressure, exhaust means connected with said bypass port to exhaust said pressurized fluid therethrough upon said shifting of said valve to establish said restricted communication between said inlet and bypass ports, means for conducting the reduced pressure at said steering gear to said first named area, means for conducting the pressure at said inlet port to said second area, and means yieldingly urging said valve means in said opposite direction, the last named means being yieldable in response to fluid pressure on said areas to enable shifting of said valve means from said closed position when the fluid pressure on said first area tends to exceed a predetermined value with respect to the fluid pressure differential across said metering port.

3. In combination, a fluid pressure actuated vehicle power steering gear, a valve housing enclosing a valve chamber and having an inlet port and a bypass port communicating with said chamber, a spool valve shiftable in opposite directions within said chamber to and for a closed position and having portions cooperable with the walls of said chamber to block communication between said ports when said valve is at said closed position and to progressively open said bypass port to said inlet port to establish restricted communication therebetween upon shifting of said valve in one of said directions from said closed position, said valve having a first effective area at one end adapted to be exposed to fluid pressure to cause shifting of said valve in the direction opposite said one direction and having a second effective area at its opposite end smaller than said first effective area and adapted to be exposed to fluid pressure to cause shifting of said valve in said one direction, pump means connected with said inlet port for supplying pressurized fluid thereto, a restricted metering port connecting said inlet port and steering gear for supplying the latter with pressurized metered fluid from said inlet port but at reduced pressure, exhaust means connected with said bypass port to exhaust said pressurized fluid therethrough upon said shifting of said valve to establish said restricted communication between said inlet and bypass ports, means for conducting the reduced pressure at said steering gear to said first named area, means for conducting the pressure at said inlet port so said second area, and means yieldingly urging shifting of said spool valve to said closed position in opposition to pressure on said second area and independently of pressure on said first area, the last named means being yieldable in response to fluid pressure on said second area to enable said shifting of said spool valve from said closed position to said open position when the fluid pressure on said second area exceeds a predetermined minimum value.

4. In an automobile steering control device, a fluid actuated power steering gear for said automobile, valve means having an inlet port and a bypass port and conduit means for connecting said ports, a source of pressurized fluid for said steering gear comprising a pump adapted to be operated by the engine of said automobile and having an inlet and an outlet connected with said bypass port and inlet port respectively, said valve means including two valve parts relatively shiftable to a closed position to block communication between said ports, and relatively shiftable from said closed position to progressively establish communication between said ports, a restricted metering port connecting said inlet port with said steering gear to supply metered actuating fluid pressure thereto, one of said valve parts having a first effective area adapted to be exposed to fluid pressure to cause relative shifting of said parts to said closed position and having a second effective area smaller than said first effective area and adapted to be exposed to fluid pressure to cause said relative shifting from said closed position, means for connecting said metered actuating pressure to said first named area, means for connecting said inlet port to said second area, and resilient means yieldingly urging said valve parts toward said closed position, the last named means being yieldable in response to fluid pressure on said areas to enable said relative shifting from said closed position when the fluid pressure on said second area tends to exceed a predetermined value with respect to the fluid pressure differential across said metering port.

References Cited by the Examiner

UNITED STATES PATENTS

| | | | |
|---|---|---|---|
| 2,724,335 | 11/55 | Eames | 60—52 X |
| 2,737,196 | 3/56 | Eames | 60—52 X |
| 3,033,221 | 5/62 | Strader | 137—101 |

JULIUS E. WEST, *Primary Examiner.*

EDGAR W. GEOGHEGAN, *Examiner.*